Figure 1:
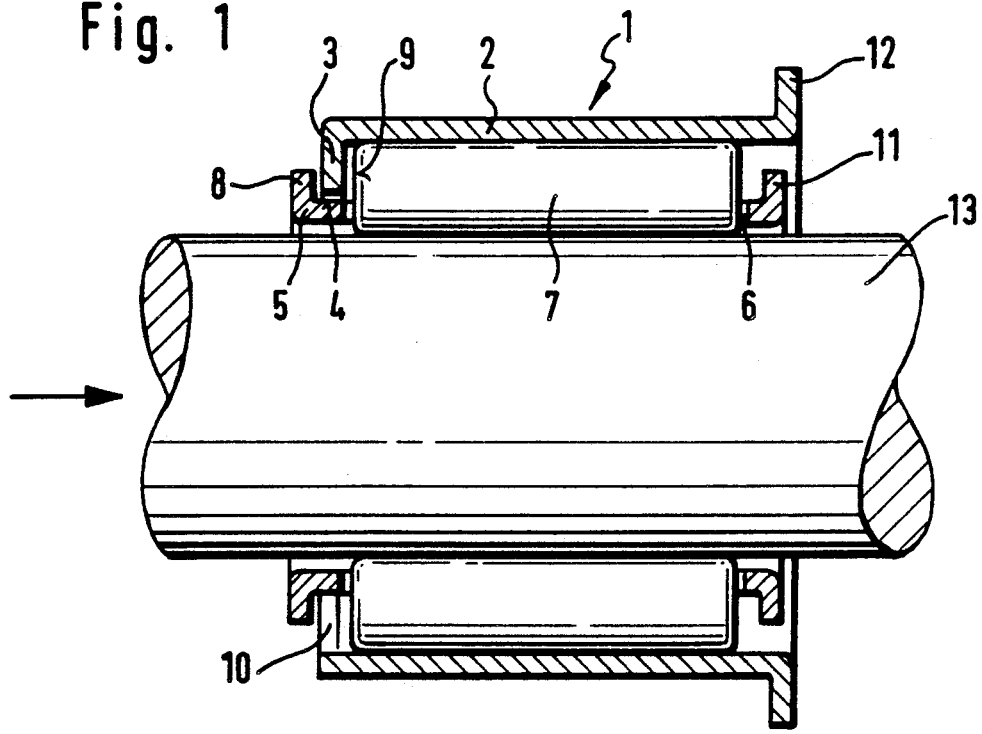

United States Patent [19]

Radinger et al.

[11] Patent Number: 4,993,849
[45] Date of Patent: Feb. 19, 1991

[54] RADIAL ROLLING BEARING

[75] Inventors: Norbert Radinger, Nuremberg; Wolfgang Steinberger, Herzogenaurach, both of Fed. Rep. of Germany

[73] Assignee: INA Walzlager Schaeffler KG, Fed. Rep. of Germany

[21] Appl. No.: 467,041

[22] Filed: Jan. 18, 1990

[30] Foreign Application Priority Data

Jan. 26, 1989 [DE] Fed. Rep. of Germany ....... 3902194

[51] Int. Cl.$^5$ ............................................. F16C 19/26
[52] U.S. Cl. ................................... 384/447; 384/511; 384/560; 384/575
[58] Field of Search ................ 384/447, 560, 509, 511, 384/575, 572, 569

[56] References Cited

U.S. PATENT DOCUMENTS

| 942,392 | 12/1909 | Koch | 384/511 |
| 1,299,579 | 4/1919 | Kirk | 384/509 |
| 2,133,030 | 10/1938 | Large | 384/511 |
| 3,230,605 | 1/1966 | Schaeffler | 384/560 |

Primary Examiner—Lenard A. Footland
Attorney, Agent, or Firm—Biermand and Muserlian

[57] ABSTRACT

A radial rolling bearing with an outer race ring having at least one radial flange which engages in a peripheral groove of a cage in which rolling elements arranged in pockets are lodged, characterized in that the radial flange delimits an opening through which the cage, radially offset with regard to the bearing axis, can be inserted axially into the race ring by parallel displacement.

8 Claims, 2 Drawing Sheets

4,993,849

RADIAL ROLLING BEARING

STATE OF THE ART

Radial rolling bearings with an outer race ring having at least one radial flange which engages in a peripheral groove of a cage in which rolling elements arranged in pockets are lodged are known, for example, from FR-OS No. 2,467,319 where the radial flange is arranged between a radial edge of the cage and the end faces of cylindrical rolling elements. These radial rolling bearings serve their purpose if no high requirements of rigidity are made of the cages. If, however, such a requirement does exist, as a rule, an end ring is provided at each cage end, the consequence being that such cages can only be mounted when, after the insertion of the cage in the race ring an end ring or a race ring flange is subsequently integrally formed. In this case, the assembly procedure is too expensive.

Furthermore, FR-PS No. 2,147,658 and FR-PS No. 2,146,837 describe radial rolling bearings in which the cage can be inserted into the outer ring in a position not corresponding to the assembled position. For doing this, the cage is turned or tilted relative to the bearing axis and then inserted into the race ring through appropriately shaped openings where it is aligned and filled with rolling elements. These bearings provide a solution which is simple to manufacture and inexpensive to assemble but which can only be employed in the case of cages of short axial mounting length. Moreover, flanges are provided in these bearings at both sides of the race ring which in certain applications results in the disadvantage that only a relatively small amount of lubricant can flow through the bearing and due to the flanges, pollutants carried by the lubricant are retained in the bearing. On the other hand, due to the flanges on both sides, the feasibility of integrally forming stops on the outer periphery of the race ring is restricted.

OBJECTS OF THE INVENTION

It is an object of the invention to provide a radial rolling bearing in which a good lubricant flow is guaranteed and in which a stop can be integrally formed on the outer periphery of the race ring and which is easy to assemble even in the case of cages with a long axial mounting length.

This and other objects and advantages of the invention will become obvious from the following detailed description.

THE INVENTION

The novel radial rolling bearing of the invention with an outer race ring having at least one radial flange which engages in a peripheral groove of a cage in which rolling elements arranged in pockets are lodged, is characterized in that the radial flange delimits an opening through which the cage, radially offset with regard to the bearing axis, can be inserted axially into the race ring by parallel displacement.

The radial flange delimits an opening through which the cage radially offset with regard to the bearing axis, can be inserted axially into the race ring by parallel displacement.

Thus, a simple possibility is created for mounting even cages with a long axial mounting length in the radial rolling bearings described which consists in axially inserting the cage, devoid of rolling elements at first, with parallel axis and radially offset, into the race ring and filling it there with rolling elements whereby the cage gets centered with the bearing axis and the radial flange engages in the peripheral groove and the cage gets fixed in both axial directions. As a result, one flange at the race ring can be dispensed with so that the lubricating oil can flow freely out of the bearing and no pollutants are retained in the bearing. At the same time, a stop integrally formed onto the outer periphery of the race ring can be provided in place of the second flange.

In a preferred embodiment of the invention, the peripheral groove of the cage in a first variant is delimited on one side by a radial edge connected to the cage and on the other by the rolling elements while in a second variant, the peripheral groove is formed by two edges connected to the cage. In further developments of the invention, the radial flange extends only over a part of the periphery of the race ring and the flange either delimits a bore eccentric to the bearing axis and having a diameter slightly larger than the outer diameter of the cage or is made as a tongue-shaped part. For reasons of fabrication, even such embodiments are provided in which the radial flange extends over the entire periphery of the race ring and even then delimits an eccentric bore. In the above embodiments, the cage is made of sheet metal and formed without chip removal.

Figure 2:
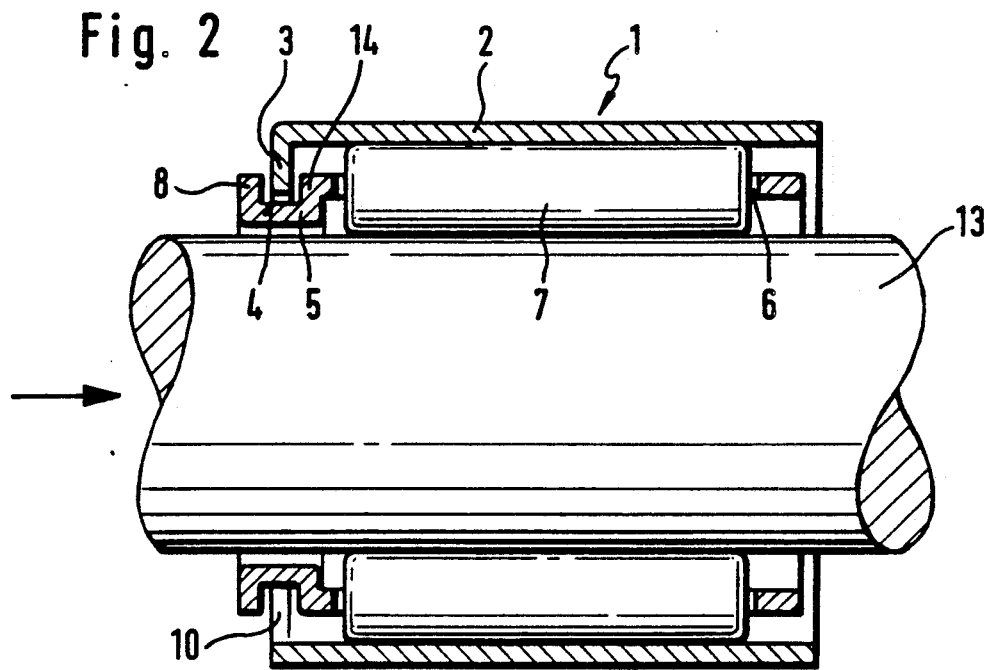
Figure 3:
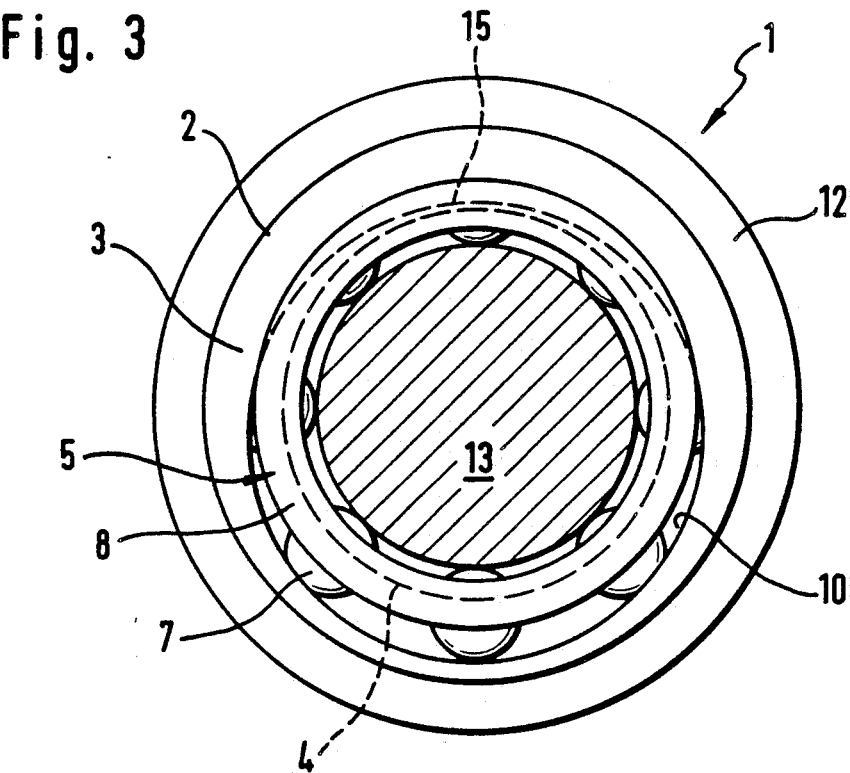
Figure 4:
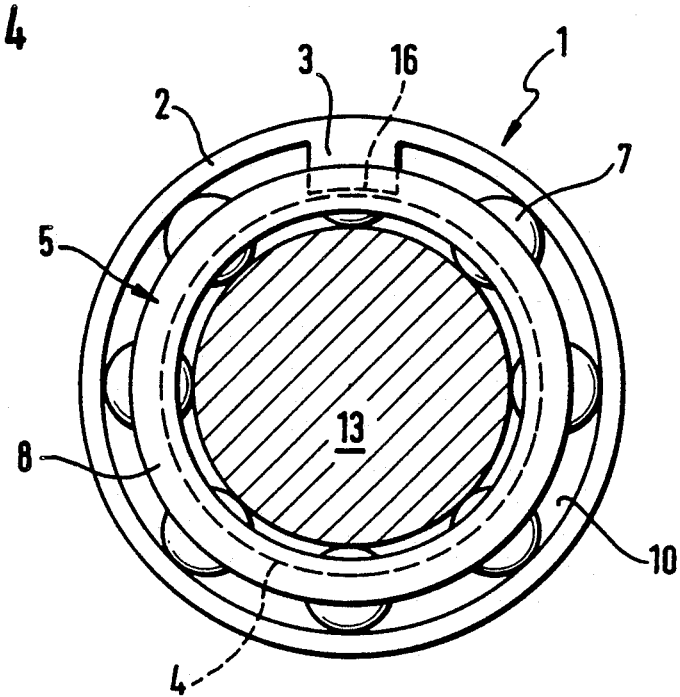

Referring now to the drawings:

FIGS. 1 and 2 are a longitudinal section through different embodiments of a radial rolling bearing of the invention and FIGS. 3 and 4 are an end view of a radial rolling bearing of FIGS. 1 and 2, respectively.

In FIG. 1, a radial rolling bearing 1 is represented in which an outer race ring 2 is provided with a radial flange 3 which engages in a peripheral groove 4 of a cage 5 in which rolling elements 7 arranged in pockets 6 are lodged. The peripheral groove 4 is delimited on one side by a radial edge 8 of the cage 5 and on the other by the rolling elements 7, and in this case, in particular by the end faces 9 of the cylindrical rolling elements 7. The radial flange 3 defines an opening 10 which is arranged eccentrically to the bearing axis so that for assembly the cage 5 not yet filled with rolling elements 7 and at first radially offset with regard to the bearing axis is inserted in the axial direction into the race ring by parallel displacement and filled there with rolling elements 7 radially from the inside to the outside. When the rolling elements 7 have been inserted into the pockets 6 of the cage 5, the cage 5 gets centered with respect to the bearing axis whereby the radial flange 3 engages into the peripheral groove 4 and the cage 5 gets fixed in both axial directions. At its axial end away from the flange, the cage 5 is provided with a reinforcing end ring 11 which serves to increase the rigidity of the cage. To improve the flow of lubricating oil, only one radial flange 3 is provided and because of the omission of the second flange, it is possible to provide an integrally formed stop 12 at the outer periphery of the race ring 2. For the sake of completeness, the shaft 13 to be mounted, is also represented.

FIG. 2 shows a radial rolling bearing 1 in which the cage 5 has a peripheral groove 4 delimited on each side by an edge 8, 14 formed in one piece with the cage 5 by non-chipping shaping of the cage 5 made of sheet material.

FIG. 3 shows an end view of a radial rolling bearing 1 of FIG. 1 and the broken line 15 indicates the overlap of the radial flange 3 with the edge 8 of the peripheral groove 4 in the cage 5. From the representation, it becomes clear that the opening 10 is made as an eccentric bore and the radial flange 3 extends only over a part of the periphery of the race ring 2.

FIG. 4 shows an end view of a radial rolling bearing 1 of FIG. 2, made and assembled by the above principle but as compared to the preceding examples of embodiment, it has a tongue-shaped flange 3. In this case too, the broken line 16 represents the overlap of the radial flange 3 with the edge 8 of the cage 5. Furthermore, it is possible to provide a stop arranged at the outer periphery of the race ring 2 even in the embodiments of FIGS. 2 and 4.

Various modifications of the bearings of the invention may be made without departing from the spirit or scope thereof and it is to be understood that the invention is intended to be limited only as defined in the appended claims.

What we claim is:

1. A radial rolling bearing with an outer race ring having at least one radial flange which engages in a peripheral groove of a cage in which rolling elements arranged in pockets are lodged, characterized in that the radial flange delimits an opening through which the cage, radially offset with regard to the bearing axis, can be inserted axially into the race ring by parallel displacement.

2. A radial rolling bearing of claim 1 wherein the peripheral groove is delimited in one axial direction by a radial edge connected to the cage and in the other axial direction by the rolling elements.

3. A radial rolling bearing of claim 2 wherein the radial flange delimits a bore eccentric to the bearing axis.

4. A radial rolling bearing of claim 2 wherein the flange is tongue-shaped.

5. A radial rolling bearing of claim 1 wherein the peripheral groove is delimited in both axial directions by edges connected to the cage.

6. A radial rolling bearing of claim 5 wherein the radial flange delimits a bore eccentric to the bearing axis.

7. A radial rolling bearing of claim 5 wherein the flange is tongue-shaped.

8. A radial rolling bearing of claim 1 wherein the cage is made of sheet material and formed without chip removal.

* * * * *